Dec. 2, 1958  S. K. GHANDHI  2,863,068
SIGNAL RESPONSIVE NETWORK
Filed Aug. 27, 1954
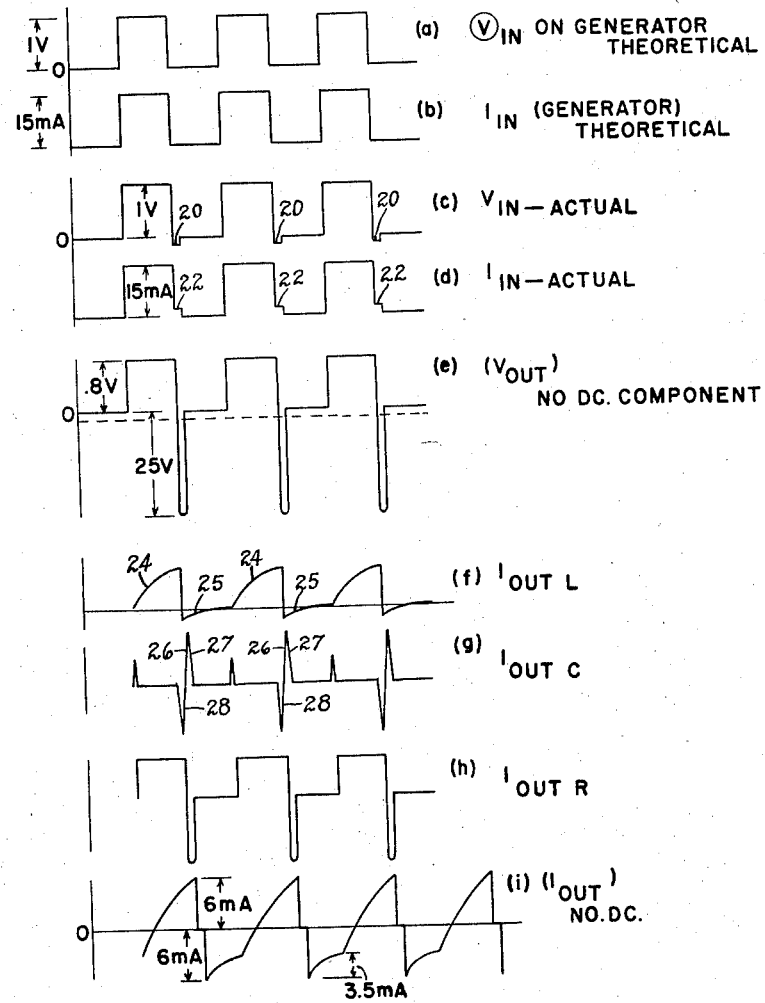
INVENTOR:
SORAB K. GHANDHI,
BY *George V. Eltgroth*
HIS ATTORNEY.

United States Patent Office 2,863,068
Patented Dec. 2, 1958

2,863,068
SIGNAL RESPONSIVE NETWORK

Sorab K. Ghandhi, Syracuse, N. Y., assignor to General Electric Company, a corporation of New York Application August 27, 1954, Serial No. 452,667

2 Claims. (Cl. 307—88.5)

This invention relates to networks utilizing the properties of rectifying injunctions exerting a mutual influence upon each other, and more particularly to such a network in which operating power is derived from the signal source.

It is frequently desired to produce a pulse of predetermined form from a control signal. Circuits for performing this service are variously referred to as "pulse forming circuits" and "pulse generating circuits." It has been known to connect one or more electrodes of thermionic vacuum tubes with an oscillatory network or delay line which is shock-excited in response to signals applied at the control element of such thermionic device. In accordance with usual laws governing the decay of oscillatory energy, a train of waves, rather than a single pulse, is initiated by each stimulus. While it is desired to eliminate all members of the wave trains, other than the first, diodes or other proper terminating arrangements are incorporated. These additional elements represent additional items of cost and further units which must be subjected to quality control standards and which occasionally fail.

In addition, such pulse forming network generally requires an auxiliary power supply for the thermionic valve, to provide exciting potentials for the electrodes, in addition to the application of signal energy. While transistors have frequently been used or proposed as alternatives to vacuum tubes with appropriate circuit modifications, such circuits also require auxiliary power supply in addition to the power derived from a signal source, and make use of similar configurations for eliminating the members of the pulse train after the first. In addition, a major logical defect in any attempt to directly, or through the dual concept, substitute transistors for vacuum tubes, is the fact that transistors have other additional intrinsic properties not completely utilized or applied through the use of the direct substitute, or dual equivalent, approach.

Accordingly it is a principal object of the invention to provide a new and simplified pulse forming circuit.

A further object of the invention is to provide a new and novel signal controlled circuit.

Another object of the invention is to provide a simple network for initiating and damping shock waves in a resonant element or network.

These and other objects and advantages of the invention will be more fully discussed in, and others will become apparent from a study of the following specification when read in conjunction with the drawings, which show a specific embodiment for the purpose of illustrating the principles of the invention. The invention is pointed out with particularity in the appended claims. In the drawings:

Figure 1 illustrates schematically a network constructed in accordance with the principles of the invention.

Figure 2 is a series of graphic depictions of current and voltage waves which may be observed at various points in the circuit of Figure 1 when excited from a relatively low source impedance; and Figure 3 is a graphic depiction of the voltage waves which may be observed in the networks of Figure 1 when excited, from a high impedance source.

Referring now in detail to Figure 1 of the drawings, there is seen a transistor 10 comprising a base electrode 13 with which there are associated collector electrode 11 and emitter electrode 12. As is well known in the art, the base may be composed of a semi-conductor having an admixture of donor or acceptor atoms in an otherwise relatively pure substance, such as germanium or silicon. The electrodes 11 and 12, in conjunction with the base 13, are so treated in accordance with well-known techniques as to develop at each a rectifying junction. The junctions formed by the electrodes 11 and 12 are in such proximity that current and voltage conditions existing at one influence the current and voltage conditions existing at the other.

A generator, illustrated schematically at 14, may be connected between the emitter electrode 12 and the base 13, while an impedence network comprising parallel connected capacitor 15 and inductor 16 may be connected between the collector electrode 11 and the base 13. The losses in the oscillatory network 15, 16 are such that the circuit has less than critical damping and accordingly, executes a number of oscillations in response to the application of a shock wave of current thereto. Output signals are derived from the terminal 17, 18, connected to the extremities of the network composed of the impedances 15, 16. Any other device, such as a distributed element line which will give rise to a train of shock waves in response to the application of a current step thereto, may be employed in the place of the network 15, 16.

In conducting the experiments giving rise to the waveforms exhibited in Figure 2, the source of impedance of the generator 14 was approximately 5 ohms, which was much less than the impedance presented between the emitter electrode 12 and base 13 in the transistor 10. The internal voltage wave produced by the generator 14 is represented in Figure 2(a), illustrating a rectangular wave of approximately fifty percent duty cycle with an amplitude of one volt. In the absence of non-linear and reactive effects in the emitter circuit of the transistor 10, a current wave of generally similar form, shown at Figure 2(b) would be produced. Its theoretical amplitude would be about 15 milliamperes.

The effects of the source impedance are apparent from Figures 2(c) and 2(d). The form of the voltage wave of Figure 2(c) follows closely that of Figure (2)a, save for the presence of a negative-going portion indicated at 20.

Similarly, the current actually flowing in the emitter circuit of the transistor 10, as shown in Figure 2'(d) closely resembles the theoretical current waveform, save for a reduced magnitude continuation of current flow indicated at 22, beyond the time when the theoretical wave decays to zero. The effects at 20, 22 arise from the reaction of the collector circuit on the emitter circuit and will later be more fully discussed.

The voltage excursions appearing across the network 15, 16 in the collector circuit are shown in Figure 2(e), and consist of a positive-going pulse of approximately 0.8 volt amplitude coincident in time with the interval when the input voltage wave at Figure 2(c) is positive. At the time when the input voltage wave in Figure 2(c) becomes zero, a negative-going pulse at approximately 25 volts amplitude appears between the terminals 17, 18. As this pulse swings positively, the collector 11 becomes positive relative to the base 13, and conducts freely, imposing a very low damping impedance on the network 15, 16 which suppresses further ringing oscillations tending to occur. Thereafter, the voltage of the collector 11 remains substantially unchanged until the arrival of the next positive-going section of the input voltage wave, after which the cycle is repeated.

As is apparent from a consideration and extension of Figures 2.9 and 2.11 in the work entitled "Principles of Transistor Circuits," edited by Richard F. Shea and published by John Wiley and Son, Inc., New York, 1953 edition, the application of collector voltage and consequent flow of collector current, such as are incident to the negative-going 25 volt excursion shown in Figure 2(e), gives rise, first, to a negative potential in the transistor emitter circuit, such as shown at 20 in Figure 2(c), while a positive value of current continues to flow. This continuing current flow accounts for the curve section of 22 in Figure 2(d). It is positive, because the role of source and load has now been interchanged, since during this portion of the cycle the emitter is a source of potential driving current through the source impedance of the generator 14. The absence of a direct-current component in Figure 2(e) is explained by the negligible D. C. resistance of the winding 16.

The current flowing through inductor 16 varies with time according to the wave shown in Figure 2(f). While the emitter current is held in the positive region, as shown in Figure 2(d) the current through the inductor 16 increases exponentially along the line 24 of the Figure 2(f). With the cessation of emitter current flow, the flow of current is transferred from the inductor 16 to the capacitor 15, as shown in Figure 2(g), when there begins an oscillation train. However, when the voltage across the circuit 15, 16 drives the collector 11 positive with respect to the base 13, the flow of current through the capacitor 15 as indicated in Figure 2(g) ceases, while the collector extracts energy from the inductor 16 through the flow of current along the limb 25 of the curve in Figure 2(f). The positive sloping portion 26 of the current through capacitor 15 arises from the transfer current flow from the inductor to the capacitor, while the negative sloping portion 27 represents the current flow occurring during the first portion of the shock induced transient.

The current flow which is observed in a resistance connected between terminals 17, 18 is shown in Figure 2(h) and corresponds in waveform to the output voltage shown at Figure 2(e), as would be expected.

The net steady state current in the output circuit appears in Figure 2(i).

Figure 3 shows the voltages appearing in the circuit of Figure 1, when the internal impedance of generator 14 is high by comparison with the resistance between the emitter 12 and base 13, Figure 3(a) represents the internal unloaded generator signal potential. Figure 3(b) illustrates the voltage between the emitter electrode 12 and base 13 which is observed with a generator voltage according to Figure 3(a) and consists of a positive portion 30, caused by the positive going signal, followed by a negative sloping portion 31 resulting from the negative impulse appearing at the collector electrode when the flow of current thereto is interrupted. After the first half cycle, the collective voltage swings positive, and the flow of current therethrough induces a positive voltage illustrated by the curve portion 32, during the discharge of the inductor 16. The negative-going impulses observed at the collector 11 when the source impedance is high by comparison with the emitter impedance, are shown in Figure 3(c).

While this principle of operation has been developed and utilized in conjunction with generators of rectangular impulses, it is obvious that these have been chosen as a representative type of signal source only. As an example of another type of impulse generator, there can be employed in the place of the generator 14 a source, such as a sweep oscillator, delivering signal energy varying over a broad spectrum. When the circuit 15, 16 is tuned to a point within the swept spectrum, an output impulse is observed across the terminals 17, 18 whenever the frequency delivered by the source 14 traverses the natural period of the circuit 15, 16.

A P-N-P transistor has been used for illustrative purposes. The body of such transistors may comprise N-type germanium, silicon or any other suitable semi-conducting material. In addition, by appropriate modification of the bias of generator 14, an N-P-N transistor may be utilized for the generation of positive-going impulses at the collector. When there exists no bias on the generator, N-P-N or P-N-P transistors may be used interchangeably, depending upon whether positive or negative-going output impulses are desired. In either arrangement, the sole source of power required for network operation is the signal energy itself, without any requirement for auxiliary power sources.

The specific embodiments shown and discussed have been chosen to illustrate the principles of the invention. As is well known to those skilled in the art, the array, disposition, and number or character of elements may be varied to meet particular operating or environmental requirements without departing from the essence of the invention.

What is claimed as new and to be secured by Letters Patent of the United States is:

1. In combination, a transistor having emitter, base and collector electrodes, signal means for supplying an input signal of periodically varying energy at a frequency variable over a band of frequencies and having output terminal connections directly connected between said emitter and base electrodes, said connections providing the sole means for applying power to said transistor, oscillatory means comprising a capacitor and inductance connected in parallel, said oscillatory means having less than critical coupling and a natural frequency within said band of frequencies, output means for obtaining a signal output having a peak amplitude exceeding that of said input signal, said oscillating means being directly connected in parallel to said output means and also being directly connected between said base and collector electrodes.

2. In combination, a semiconductor device having input and output electrodes associated with a common base electrode, signal means supplying an input signal of periodically varying energy and having output terminal connections directly connected between said input electrode and said common electrode, said connections providing the sole means for applying power to said transistor, an oscillatory network comprising a capacitor and inductor connected in parallel, said network being directly connected between said output and said common electrodes, and means for connecting a load device between said base and collector electrodes.

References Cited in the file of this patent

UNITED STATES PATENTS

| | | |
|---|---|---|
| 2,594,336 | Mohr | Apr. 29, 1952 |
| 2,644,893 | Gehman | July 7, 1953 |
| 2,777,057 | Pankove | Jan. 8, 1957 |